(12) United States Patent
Bowers, Jr.

(10) Patent No.: US 8,293,097 B2
(45) Date of Patent: Oct. 23, 2012

(54) SYSTEM FOR CONTINUOUS OPTIMIZATION OF WASTEWATER TREATMENT

(76) Inventor: Gregory Scott Bowers, Jr., Greenville, SC (US)

(*) Notice: Subject to any disclaimer, the term of this patent is extended or adjusted under 35 U.S.C. 154(b) by 592 days.

(21) Appl. No.: 12/381,948

(22) Filed: Mar. 17, 2009

(65) Prior Publication Data

US 2009/0230033 A1 Sep. 17, 2009

Related U.S. Application Data

(60) Provisional application No. 61/069,733, filed on Mar. 17, 2008.

(51) Int. Cl.
*C02F 1/52* (2006.01)
(52) U.S. Cl. ............. 210/96.1; 210/205; 210/198.1; 348/81
(58) Field of Classification Search .......... 210/745, 210/709, 85, 96.1, 205, 198.1; 700/267, 700/271; 348/81; 702/22–23, 26–27, 29; 73/61.42
See application file for complete search history.

(56) References Cited

U.S. PATENT DOCUMENTS

| | | | |
|---|---|---|---|
| 4,654,139 A | 3/1987 | Baba et al. | |
| 4,783,269 A | 11/1988 | Baba et al. | |
| 4,923,599 A | 5/1990 | Bowers | |
| 4,999,116 A | 3/1991 | Bowers | |
| 5,037,559 A * | 8/1991 | Schmitt | 210/709 |
| 5,045,213 A | 9/1991 | Bowers | |
| 5,324,431 A * | 6/1994 | Watanabe et al. | 210/614 |
| 5,645,799 A | 7/1997 | Shah et al. | |
| 6,511,611 B2 * | 1/2003 | Temple et al. | 252/181 |

* cited by examiner

*Primary Examiner* — Terry Cecil
(74) *Attorney, Agent, or Firm* — J. Bennett Mullinax, LLC

(57) ABSTRACT

A system for controlling the injection of wastewater treatment chemicals into a wastewater treatment stream includes a holding tank for collecting and holding wastewater being treated, a camera positioned for making images of the wastewater in the holding tank, a computer for automatically making the images of the wastewater in the holding tank at scheduled intervals. The computer analyzes the images in order to determine the necessity for injecting wastewater treatment chemicals into the wastewater stream by measuring the size, distribution and number of pixels of differing colors and appearances, such that pixels of differing colors and appearances represent differing metal moieties in the wastewater stream. A pump and injection port injects wastewater treatment chemicals into the wastewater stream responsive to the analysis of the images indicating the necessity of such injection.

15 Claims, 4 Drawing Sheets

SYSTEM FOR CONTINUOUS OPTIMIZATION OF WASTEWATER TREATMENT

The present application claims the benefit of prior provisional U.S. Ser. No. 61/069,733, filed Mar. 17, 2008.

FIELD OF THE INVENTION

The present invention is generally directed to a system for adjusting the dosage of wastewater treatment chemicals in an automated fashion requiring limited operator oversight. More particularly, the present invention is directed to such a system in which photography, most preferably digital photography, is employed to monitor the wastewater stream.

BACKGROUND OF THE INVENTION

Industrial wastewaters commonly include a variety of contaminants which require treatment (i.e., removal) even before the wastewater can be discharged from the plant site. The nature of the wastewater contaminants is in large part dependent on the commercial processes practiced in the plant. Accordingly, there is great variety in the nature of wastewater contaminant problems. Moreover, the matrix (i.e., makeup) of wastewater even at a given commercial site will usually vary, sometimes dramatically, with changes in production or the like.

Particular industries, for example such as those relating to metal plating, metal finishing, or circuit board manufacturing activities, generate wastewater with heavy metals (e.g., copper, nickel, etc.) and other metals in solution with such wastewater. The commercial activities themselves may inherently generate heavy metals which are chelated and/or complexed for purposes of the commercial activity (e.g., metal plating) itself. Chelating and/or complexing tends to cause such metals to remain in solution, and thus require special attention for their removal.

During the typical course of plant activity, heavy metal concentration in the wastewater is highly variable. While concentration variations can in general be expected, monitoring of and reacting to specific variations is problematic. Concentrations of heavy metals may typically vary from a few parts per million to several hundred parts per million, even in a very short time, such as a matter of minutes.

Not only do concentration levels vary drastically, but also extreme variations can be experienced with respect to the matrix (both in identity and nature, e.g., chelated versus non-chelated) of heavy metals present.

In general, it is known to add (i.e., feed) various precipitating agents to wastewater to precipitate such heavy metals for their removal from the water. The amount of such precipitating agents required (i.e. consumed) in the course of precipitating such heavy metals of course depends on the degree of presence of such heavy metals in solution with the wastewater. Since effective real time monitoring of heavy metal concentration levels has heretofore generally proven difficult, such treatment chemical feeding (i.e. the feed rate of precipitating agents) is typically set at a compromise level, such as for precipitating the maximum expected concentration of heavy metals. Such a compromise setting creates an excess amount of sludge, which sludge may often be classified as a hazardous waste. Moreover, since the cost of the treatment chemicals is not insignificant, wasteful overfeeding thereof is costly.

Operators have been known to attempt periodic checks to manually detect the level of metals entering the wastewater (i.e., assess the expected concentrations), and adjust the chemical feed rate accordingly. However, such a manual adjustment merely alters the set feed rate in accordance with periodic reassessments of the anticipated maximum concentration, and does nothing to eliminate excess sludge production and excessive and costly chemical usage caused by differences between actual concentration levels and the anticipated maximums thereof. Moreover, short-term spikes can still occur, meaning that inadequately treated wastewater can be nonetheless discharged. Such occurrences are particularly problematic where applicable laws regulate the permissible discharge concentration levels, such as to certain fractional parts per million or certain parts per million.

In some industrial settings, anticipation of heavy metal concentrations in the wastewater may be relatively less "predictable". For example, a totally unexpected occurrence of heavy metals in the wastewater can go unchecked, thereby causing the plant to exceed permissible discharge levels. For example, maintenance personnel might empty mop buckets or the like containing chelated heavy metals picked up from the floor of the facility, which could cause a heavy metal concentration spike in the wastewater at a time whenever commercial activity in the plant is nil, and precipitating agent feed pumps may be switched off. The plant is nonetheless responsible for its wastewater discharge, though no effective continuous monitoring systems for preventing such undesirable discharges may be available.

It is generally known that certain metals in solution in wastewater may be precipitated therefrom by controlling the pH level of the wastewater. For example, non-chelated and non-complexed metals in particular may be in various degrees precipitated in such manner. Automatic controllers are generally available which function to probe the wastewater for its pH level, and automatically pump treatment chemicals accordingly to the wastewater so as to adjust its pH level within an established deviation from a pre-selected set point. One example of such a controller is the Model 5 proportional pH pump controller, made by Chem-Tech International, Inc., of 92 Bolt Street, Lowell, Mass., 01853. While such a controller may be effective for metals which may be precipitated through such pH inducement, heavy metals which are chelated and/or complexed generally will not be precipitated with such pH level control. Thus, the monitoring and treatment problems noted above persist, and may be compounded where a changing mix of chelated and non-chelated metals is presented for treatment.

Another aspect of wastewater treatment problems where both such types of metals are in solution (i.e., which can and can not be practically precipitated through pH inducement) is that use of a precipitating agent can precipitate both such types of metals. However, unnecessary sludge production is caused by precipitating metals in such a manner which could have otherwise been precipitated through pH level control (as generally discussed above). Again, the amount of precipitating agent consumption is also a factor.

In addition to the availability of known pH level control generally outlined above, at least one other generally known method, involving a so-called oxidation reduction potential probe, attempts to address precipitating agent usage. Such a probe is typically used to detect the presence of excess (i.e. un-consumed) precipitating agent at a phase of a wastewater treatment program after all the metal is removed. One particular limitation of such a system is that it cannot distinguish between, for example, chelated and non-chelated metals, and must therefore feed precipitating agent until there is an excess of such agent present in the water. Feed control feedback also is derived from detected excess agent, not from information relative remaining metal in solution to be precipitated. Thus, there is no effective prevention of excess sludge generation or wasteful chemical usage.

Another limitation of a waste treatment system utilizing an oxidation reduction potential (ORP) probe is that the probe operation involves an electrical measurement which is affected by changes in the pH level of the wastewater, the amount of total dissolved solids therein, the oxidizer concentration, and the amount of chelated metal in the wastewater. Thus, an ORP probe system is inherently ineffective for use in providing close control of the feeding of chemical treatment solutions into wastewater treatment systems.

For example, U.S. Pat. Nos. 5,045,213; 4,999,116; and 4,923,599, all to the present common assignee, all incorporated herein by reference, are directed to wastewater treatment for the removal of heavy metals, which is optimized by continuously removing and filtering a sample flow of treated wastewater subject to pH level control to determine the presence of remaining metals in solution to be precipitated Thus, chemical precipitation is the most common technology used to remove dissolved (ionic) metals from solutions, such as process wastewaters containing toxic metals. The ionic metals are converted to an insoluble form (particle) by the chemical reaction between the soluble metal compounds and the precipitating reagent. The particles formed by this reaction are removed from solution by settling and/or filtration. The effectiveness of a chemical precipitation process is dependent on several factors, including the type and concentration of ionic metals present in solution, the precipitant used, the reaction conditions (especially the pH of the solution), and the presence of other constituents that may inhibit the precipitation reaction.

Further, in wastewater treatment operations, the processes of coagulation and flocculation are employed to separate suspended solids from water. Although the terms coagulation and flocculation are often used interchangeably, or the single term "flocculation" is used to describe both; they are, in fact, two distinct processes.

Finely dispersed solids (colloids) suspended in wastewaters are stabilized by negative electric charges on their surfaces, causing them to repel each other. Since this prevents these charged particles from colliding to form larger masses, called flocs, they do not settle. To assist in the removal of colloidal particles from suspension, chemical coagulation and flocculation are required. These processes, usually done in sequence, are a combination of physical and chemical procedures. Chemicals are mixed with wastewater to promote the aggregation of the suspended solids into particles large enough to settle or be removed.

Coagulation is the destabilization of colloids by neutralizing the forces that keep them apart. Cationic coagulants provide positive electric charges to reduce the negative charge (zeta potential) of the colloids. As a result, the particles collide to form larger particles (flocs). Rapid mixing is required to disperse the coagulant throughout the liquid. Care must be taken not to overdose the coagulants as this can cause a complete charge reversal and restabilize the colloid complex.

Flocculation is the action of polymers to form bridges between the flocs and bind the particles into large agglomerates or clumps. Bridging occurs when segments of the polymer chain adsorb on different particles and help particles aggregate. An anionic flocculant will react against a positively charged suspension, adsorbing on the particles and causing destabilization either by bridging or charge neutralization. In this process it is essential that the flocculating agent be added by slow and gentle mixing to allow for contact between the small flocs and to agglomerate them into larger particles. The newly formed agglomerated particles are quite fragile and can be broken apart by shear forces during mixing. Care must also be taken to not overdose the polymer as doing so will cause settling/clarification problems. Anionic polymers themselves are lighter than water. As a result, increasing the dosage will increase the tendency of the floc to float and not settle.

Once suspended particles are flocculated into larger particles, they can usually be removed from the liquid by sedimentation, provided that a sufficient density difference exists between the suspended matter and the liquid. Such particles can also be removed or separated by media filtration, straining or floatation. When a filtering process is used, the addition of a flocculant may not be required since the particles formed by the coagulation reaction may be of sufficient size to allow removal. The flocculation reaction not only increases the size of the floc particles to settle them faster, but also affects the physical nature of the floc, making these particles less gelatinous and thereby easier to dewater.

Thus, representative of typical prior art patents, U.S. Pat. No. 5,328,599 is directed to a wastewater treatment system and method for chemical precipitation and removal of metals from wastewater in a continuous or batch treatment process which includes an ion-selective electrode and a reference electrode disposed in a precipitation tank for measuring an electrochemical potential therebetween in a predetermined range. A controller unit is provided which is responsive to the electrochemical potential in the predetermined range and is connected to a precipitant feed unit for automatically controlling the chemical precipitant fed into the precipitation unit.

U.S. Pat. No. 5,645,799 is directed to an apparatus for optimizing the dosage of a chemical wastewater treatment agent employing a fluorescent tracer. The apparatus includes a series of components that sample the waste stream, process the sample for analysis, analyze the sample, record the data in a historical database, and, based upon the analysis as compared to historical data, adjust the chemical feed system to optimize the chemical wastewater treatment agent according to a programmed optimization logic.

Photography has been employed to a limited extent in wastewater treatment processes. For example, U.S. Pat. No. 4,654,139 is directed to a flocculating system in which the speed at which water in a flocculating tank is mixed varies with the size of flocs photographed. Of slightly more relevance to the present invention is U.S. Pat. No. 4,783,269, which is directed to an injection control system for a flocculating agent which includes a flocculating pool into which the inflow liquid flocculating agent is injected and which forms flocs of suspended matters in the liquid; flocculating agent injecting means for injecting the flocculating agent into the flocculating pool; floc image pickup means for photographing a state of the flocs in the flocculating pool and for converting luminance data of the flocs into an electric signal; image recognizing means for recognizing the shape of the flocs by binarizing the image signal derived from the floc image pickup means on the basis of a luminance level of each pixel; flocculation state deciding means for calculating a characteristic amount of a diameter distribution of the flocs on the basis of the floc shapes recognized by the image recognizing means; and injection amount control means for controlling an amount of the flocculating agent which is injected from the flocculating agent injecting means on the basis of the characteristic amount.

However, the images generated and analyzed by the image recognizing means of the '269 patent are limited to shapes, sizes and luminance of the particles being photographed, essentially black and white photographs with shades of gray.

To the eye of the image recognizing means of the '269 patent everything is a floc, the only questions are—what is its shape, how large is it, and what is its volume based on the luminance or intensity of the signal? Thus, the '269 patent fails to provide a system capable of recognizing differing species in a wastewater stream and adjusting the injection of a variety of chemical wastewater treatment agents in response.

SUMMARY OF THE INVENTION

The present invention addresses such drawbacks and shortcomings, and others, of prior wastewater treatment techniques. Accordingly, it is a general object of the present invention to provide improved wastewater treatment methods, and apparatus for practicing same. It one particular object to provide such improved wastewater treatments relating to the removal of heavy metals.

It is a more general object to provide an improved wastewater treatment which effectively minimizes treatment chemical consumption.

In providing such improved method and apparatus, it is yet a further object of this invention to provide same with the ability to change a chemical treatment solution feed rate so as to automatically match varying demands of the wastewater chemistry, thereby resulting in such reduced treatment chemical consumption In providing such an automatically operative system, it is an object to provide a system which can be practically operated substantially continuously, and so as to greatly reduce a plant operators time needed to manage and maintain same.

It is another more general object of the present invention to provide for improved wastewater treatment which permits continuous and automatic achievement of a predetermined set point of heavy metal concentration in solution (such as legislatively mandated levels in parts per million or fractions thereof). It is a more particular object to provide such a system which is effective in achieving such objects despite even wide variations in the heavy metal concentrations, such as may occur from entirely unanticipated dumps of relatively high heavy metal concentrations into the wastewater flow.

In providing such improved wastewater treatment methods and apparatus, it is an object to provide for continuous practice thereof in conjunction with an otherwise continuously operating wastewater treatment system, such as a system having a plurality of consecutive treatment stages.

It is yet another object of the present invention to provide such an improved waste water treatment system, which is effective for controlling the consumption of a wide variety of available precipitating agents.

In connection with consumption monitoring and limiting, it is another object to provide a controller for precipitating agent feeding, even where such agent is used for an alternative commercial purpose, such as for a biocide (encountering and killing microbiological activity, or the like for treating a given aqueous suspension. It is a particular object to provide such a controller effective for controlling the level of such a consumable agent used as a biocide in connection with a generally aqueous papermaking suspension or sugar-making suspension. Alternatively, an object is to utilize the present invention in controlling the level of a consumable biocide in cooling water of a cooling water tower.

It is yet another general object of the present invention to provide for improved wastewater treatment which effectively distinguishes between metals in solution which are chelated and/or complexed, and those which are non-chelated and/or non-complexed, so as to enable efficient utilization of a precipitating agent for the chelated and/or complexed metals. It is a further object to provide for controlled feeding of such precipitating agent to the wastewater to be treated, instead of merely allowing feeding of such precipitating agent at a calculated rate based on anticipated maximum heavy metal concentrations.

The foregoing objects and advantages, and others, of the present invention may be embodied in a variety of methods, apparatus, and devices in accordance with the present invention. Alternative embodiments of the present invention may include various combinations of features in accordance with this invention, which features are discussed in greater detail below. Moreover, such embodiments may in the alternative be embodied as either practice of a method including such features as various steps or the like of such method, or embodied as an apparatus, a device, system or the like including components or means in correspondence with such combination of features.

Accordingly, the present invention is directed to a wastewater treatment system capable of determining the varying species contained in the wastewater stream and adjusting the injection of appropriate chemical wastewater treatment agents in response to such determination. This is achieved by providing a system for controlling the injection of wastewater treatment chemicals into a wastewater stream, which includes a holding tank for collecting and holding wastewater being treated, a camera positioned for making images of the wastewater in the holding tank, means for automatically making the images of the wastewater in the holding tank at scheduled intervals, means for analyzing the images in order to determine the necessity for injecting wastewater treatment chemicals into the wastewater stream, comprising measuring the size, distribution and number of pixels of differing colors and appearances, such that pixels of differing colors and appearances represent differing moieties in the wastewater stream including unreacted waste products and unreacted wastewater treatment chemicals, and means for injecting wastewater treatment chemicals into the wastewater stream responsive to the analysis of the images indicating the necessity of such injection. Preferably, the camera is a digital camera which either produces still photographs or video images.

In one preferred embodiment the camera is positioned above the holding tank and is focused on the wastewater in the holding tank therebelow. However, it is also within the scope of the present invention that the camera is contained within a waterproof housing and is submerged in the wastewater in the holding tank.

Preferably, the means for analyzing the images in order to determine the necessity for injecting wastewater treatment chemicals into the wastewater stream is a computer and the means for injecting wastewater treatment chemicals into the wastewater stream is controlled by the computer, thereby limiting the need for operator involvement. Preferably, the computer determines the particle sizes of differing moieties in the wastewater stream by the grouping of pixels of similar color and appearance and it determines the concentrations of differing moieties in the wastewater stream by the spacing between the various pixels.

Optionally, the means for injecting wastewater treatment chemicals into the wastewater stream injects the chemicals upstream and prior to flow into the holding tank, downstream and after flow from the holding tank, or directly into the holding tank.

The present apparatus is appropriate for use in both batch treatment processes and flow-through treatment processes.

In a preferred embodiment the wastewater treatment chemicals are selected from precipitants, coagulants, flocculants, anti-foam or wetting agents and weighting agents.

In an alternative embodiment the present invention is directed to a system for controlling the injection of wastewater treatment chemicals into a wastewater stream, which includes a holding tank for collecting and holding wastewater being treated; a spectrophotometer positioned for analyzing of the wastewater in the holding tank; and means for injecting wastewater treatment chemicals into the wastewater stream responsive to the analysis of spectrophotometer indicating the necessity of such injection.

While specific exemplary embodiments are disclosed above, and discussed in greater detail below, those of ordinary skill in the art will appreciate various modifications to features and aspects of this invention which may be practiced in accordance with the broader teachings thereof. Such modifications include, but are not limited to, variations in particular means, steps, or features, various combinations thereof, and various substitution of equivalent features and means, or the like. It is intended by virtue of present reference thereto that all such modifications and variations come within the spirit and scope of this invention.

BRIEF DESCRIPTION OF THE FIGURES OF THE DRAWING

A full and enabling disclosure of the present invention, including the best mode thereof, is set forth below, in conjunction with reference to the accompanying figures, in which.

DETAILED DESCRIPTION OF THE PREFERRED EMBODIMENTS

In conjunction with the following description of exemplary embodiments of this invention, it is to be understood that features and aspects of this invention may be variously practiced in combination with a variety of wastewater treatment systems, not all of which are necessarily shown nor explicitly mentioned hereinafter. However, specific exemplary embodiments are presented herewith and discussed in detail below to provide those of ordinary skill in the art with an adequate disclosure of this invention for practicing same, either as shown and discussed herein or as adapted by such persons from time to time for conformance with their particular requirements.

Figure 1:
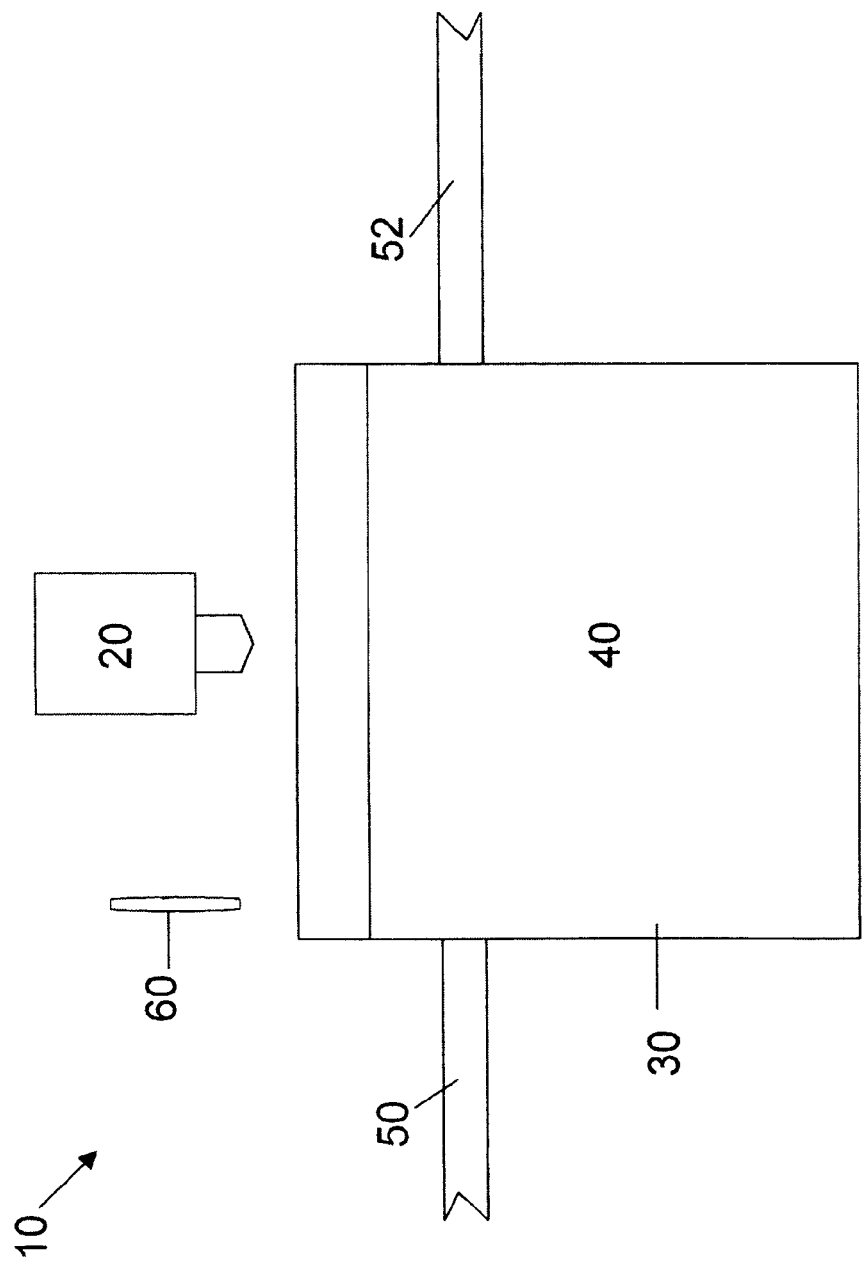
FIG. 1 is a schematic drawing of a wastewater treatment process with a high-resolution digital camera positioned above a holding tank in accordance with the present invention.
Figure 3:
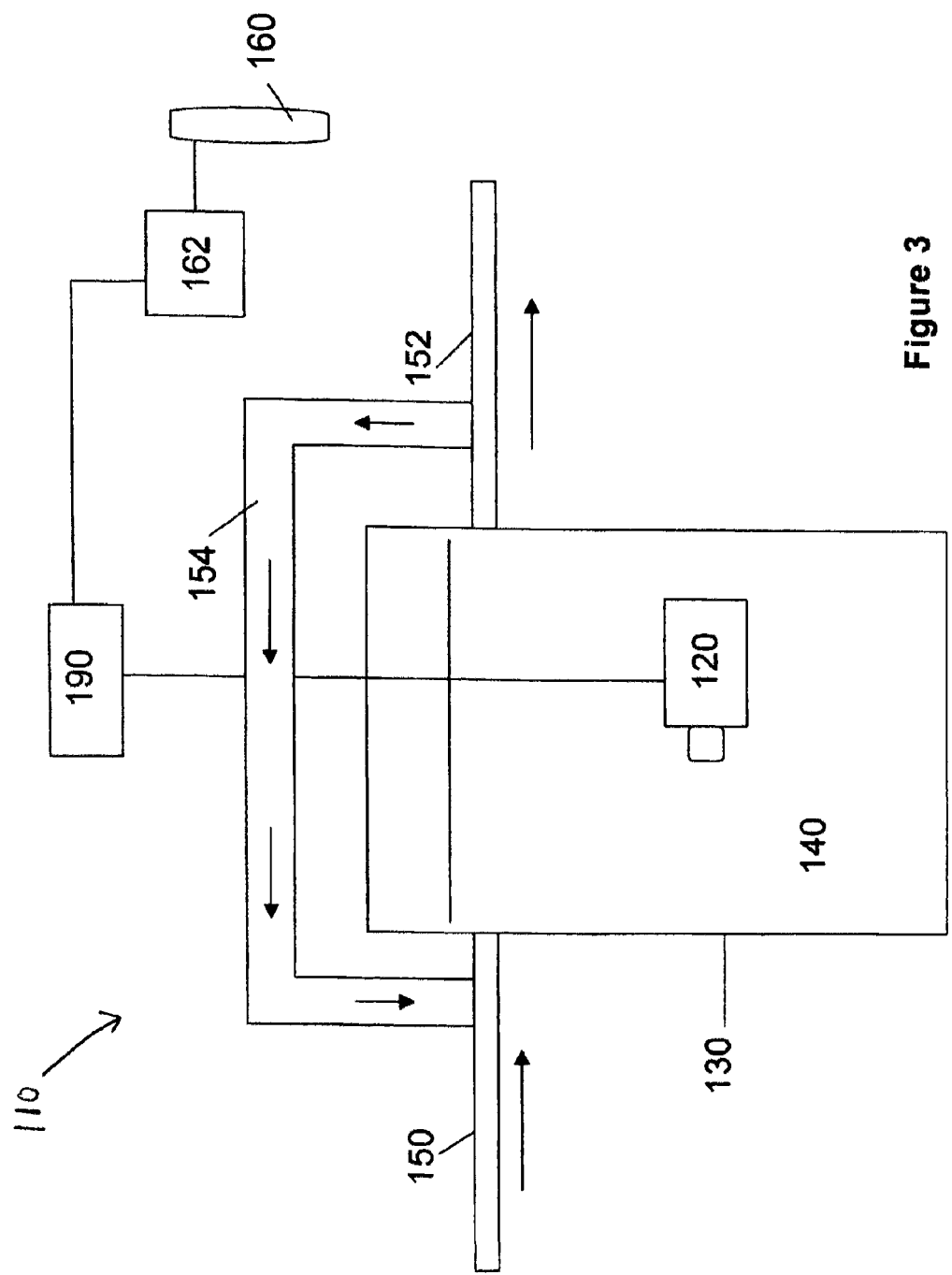
FIG. 3 is a schematic drawing of wastewater treatment process with a high resolution digital camera positioned in a holding tank in accordance with the present invention.

Thus, FIG. 1 schematically illustrates the system 10 of the present invention in which high resolution digital camera 20 is positioned above holding tank 30 containing wastewater 40. Pipe 50 flows into the holding tank and pipe 52 carries the wastewater stream from the holding tank. It should be noted that the term "holding tank" generally refers to any vessel or conduit in the wastewater stream at which the wastewater may be photographed, either from above as is illustrated in FIG. 1 or by means of a submerged camera such as is shown in FIG. 3, discussed below, and is not limited to any particular type or structure of tank or vessel. Further it should be noted that the present apparatus and method is appropriate for use in a flow-through process, in which wastewater continually flows into and out of the holding tank at pipes 50 and 52, respectively, and a batch process, in which holding tank 30 is filled, treated and then emptied An injection port, capable of injecting wastewater treatment chemicals into the wastewater stream is schematically illustrated at 60. In this embodiment the injection port is positioned to inject wastewater treatment chemicals directly into holding tank 30 as would be appropriate for either a batch or flow-through process but necessary for a batch process. Thus, in accordance with the present invention the wastewater contained in the holding tank is periodically photographed by the high-resolution digital camera 20. The photographs are analyzed and differing moieties within the wastewater are identified. Depending on the analysis, treatment chemicals may be fed to the wastewater through the injection port 60. Any of a variety of treatment chemicals may be injected, as are discussed in greater detail below. For the treatment of pollutant heavy metals a preferred treatment composition is an essentially insoluble heavy metal slurry, sold under the tradename Insolmet® by Southern Water Treatment, Inc., Greenville, S.C., disclosed and claimed in U.S. Pat. Nos. 7,001,583 and 6,896,817, both of which are hereby incorporated herein by reference and are to the present common assignee.

Figure 2:
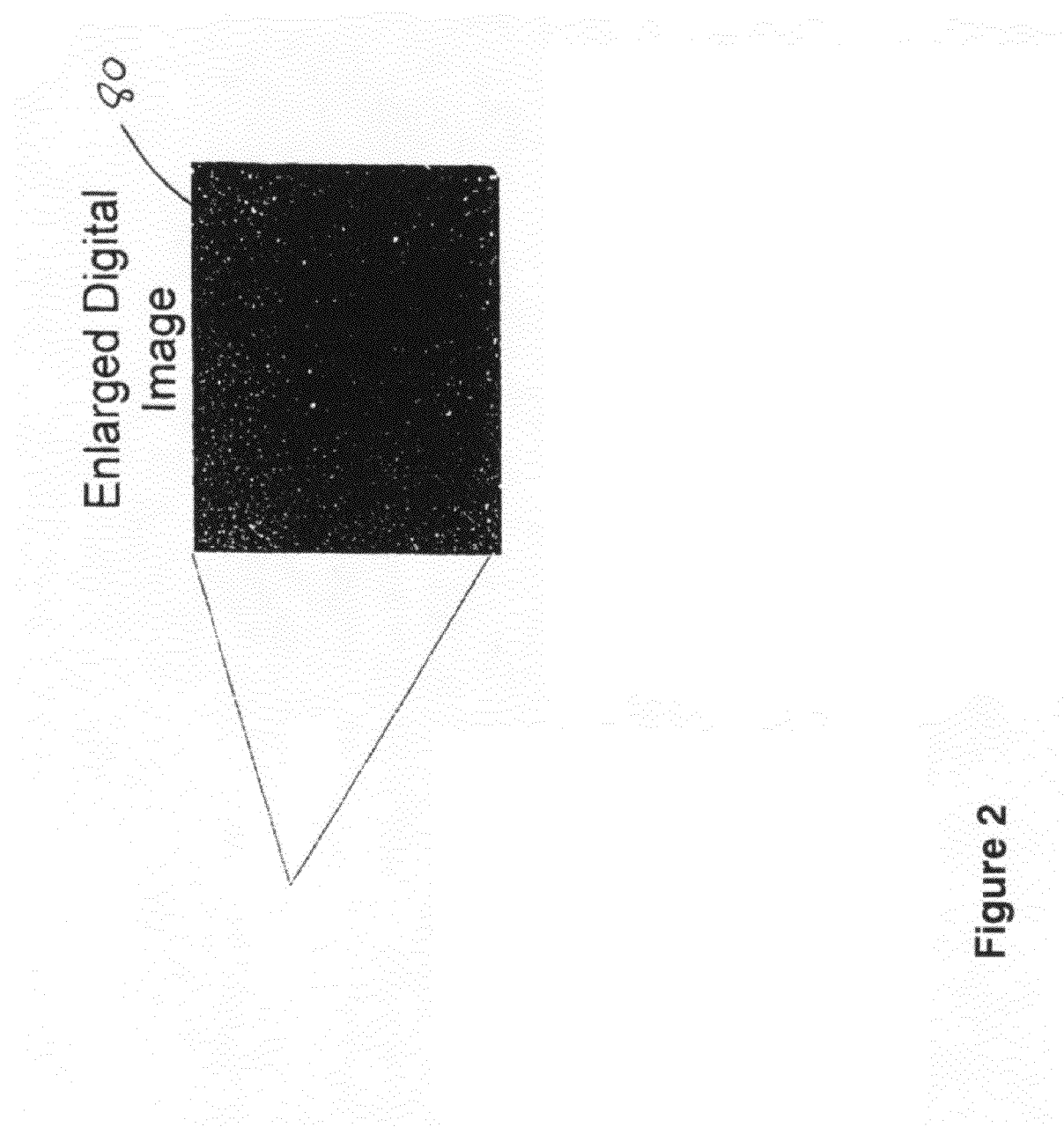
FIG. 2 is a schematic illustration of a digital photograph of the waste contained in the holding tank of FIG. 1, in accordance with the present invention.

FIG. 2 schematically illustrates a digital photograph 80 as taken by camera 20 in accordance with the present invention. Differing color pixels represent differing moieties in the wastewater stream. For example chromium hydroxide appears as light blue pixels. Chromium sulfide, which is the result of the precipitating reaction between chromium hydroxide and an iron sulfide precipitant, appears as black pixels. Injection of further iron sulfide is based on the analysis of the ratio of chromium hydroxide to chromium sulfide in the wastewater as evidenced by photograph 80.

FIG. 3 schematically illustrates a system 110 of the present invention in which high resolution digital camera 120 is capable of taking digital videos is positioned in holding tank 130 containing wastewater 140. Such embodiment may be preferred when the wastewater stream is soapy such that meaningful photography from the outside into the tank is limited. As in the embodiment of FIG. 1, the contents of pipe 150 flows into the holding tank and pipe 152 carries the wastewater stream from the holding tank. An injection port, capable of injecting wastewater treatment chemicals into the wastewater stream is schematically illustrated at 160. In this embodiment the injection port is positioned to inject wastewater treatment chemicals into the wastewater stream downstream of the holding tank 130 as would be appropriate in a flow-through process. Thus, in accordance with the present invention the wastewater contained in the holding tank is periodically photographed or videoed by the high-resolution digital camera 120. The present embodiment schematically illustrates that the digital photographs or videos taken by camera 120 are analyzed by computer 190 which controls pump 162 of injection port 160. Specifically the computer 190 analyzes the images made by camera 120 and identifies differing moieties and concentrations of such contained within the wastewater. Depending on the analysis, the computer may determine that further treatment chemicals are required and direct pump 162 to feed such into the wastewater through the injection port 160, it may determine that concentrations and ratios of the various moieties within the wastewater stream are satisfactory and do nothing, or it may determine that there is an excess of a particular treatment chemical and run the system through a recycle loop as is indicated at conduit 154.

Figure 4:
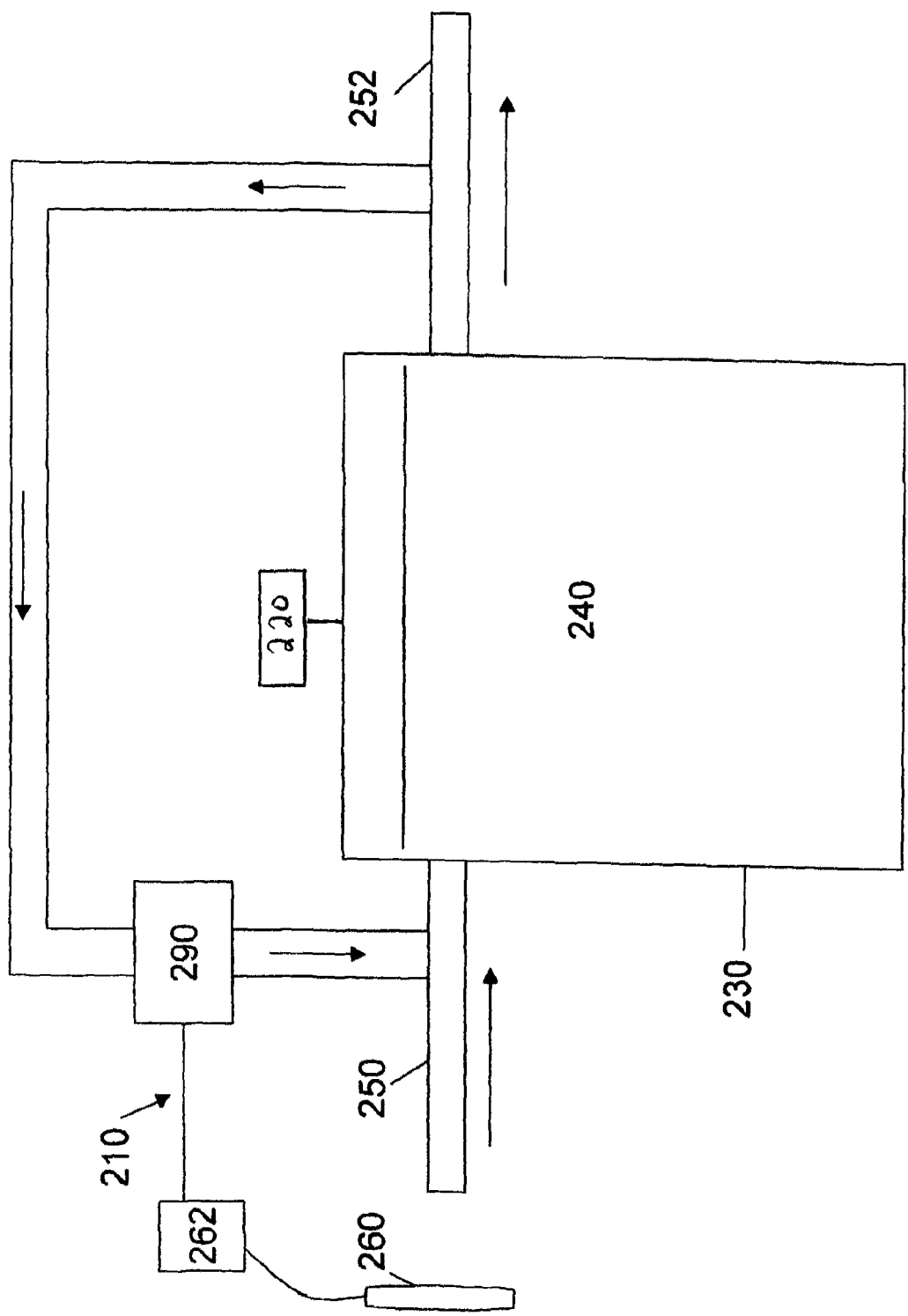
FIG. 4 is a schematic drawing of the system of the present invention.

FIG. 4 schematically illustrates a system 210 of the present invention in which camera 220 is an analog camera and is positioned above holding tank 230 containing wastewater 240. As in the embodiments of FIGS. 1 and 3, the contents of pipe 250 flows into the holding tank and pipe 252 carries the wastewater stream from the holding tank. An injection port, capable of injecting wastewater treatment chemicals into the wastewater stream is schematically illustrated at 260. In this embodiment the injection port is positioned to inject wastewater treatment chemicals into the wastewater stream upstream of the holding tank 230 as would be appropriate in a flow-through process. Thus, in accordance with the present invention the wastewater contained in the holding tank is periodically photographed by camera 220. The present embodiment schematically illustrates that the photographs taken by camera 220 are analyzed by computer 290 which converts the image to a digital image. As above computer 290 controls pump 262 of injection port 260. Specifically the computer 290 analyzes the photographs taken by camera 220 and identifies differing moieties and concentrations of such contained within the wastewater. As above, depending on the analysis, the computer may determine that further treatment chemicals are required and direct pump 262 to feed such into the wastewater through the injection port 260, it may determine that concentrations and ratios of the various moieties within the wastewater stream are satisfactory and do nothing, or it may determine that there is an excess of a particular treatment chemical and run the system through a recycle loop as is indicated at conduit 254.

Thus, the present system advantageously adjusts the dosage of wastewater treatment chemicals in an automated fashion requiring limited operator oversight. Further, all treatment processes and chemicals may be monitored and controlled by the present system. Specifically, the present apparatus and method may be employed to control the addition of a variety of treatment chemicals including precipitants, coagulants, flocculants, anti-foam or wetting agents, and weighting agents. Examples of such agents include aluminum chlorohydrate, aluminum sulfate, sodium aluminate, ferrous chloride, ferrous sulfide, lime, magnesium chloride, magnesium hydroxide, sodium dimethyldithiocarbamate, sulfides, trithiocarbonate, metabisulfite, calcium chloride, all forms of iron, sodium hydrosulfide, sodium hydrosulfite, sodium borohydride and TMT.

It will be appreciated that the foregoing examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention which is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

What is claimed is:

1. A system for controlling the injection of wastewater treatment chemicals into a wastewater stream, comprising:
    a holding tank for collecting and holding wastewater having metal particles therein:
    a camera positioned for making images of the wastewater in the holding tank;
    a means for analyzing the images to determine an identity of metal particles by evaluation of metal particle sizes, metal particle colors, and metal particle shapes present within the wastewater;
    means for determining the necessity for injecting wastewater treatment chemicals into the wastewater stream based upon the identity of the metal particles; and
    means for injecting wastewater treatment chemicals into the wastewater stream responsive to the analysis of the images indicating the necessity of such injection.

2. The system set forth in claim 1 wherein the camera comprises a digital camera.

3. The system set forth in claim 2 wherein the means for analyzing the images in order to determine the necessity for injecting wastewater treatment chemicals into the wastewater stream comprises a computer and wherein the means for injecting wastewater treatment chemicals into the wastewater stream is controlled by the computer, thereby limiting the need for operator involvement.

4. The system set forth in claim 3 wherein the computer determines the particle sizes of differing moieties in the wastewater stream by the grouping of pixels of similar color and appearance.

5. The system set forth in claim 3 wherein the computer determines the concentrations of differing moieties in the wastewater stream by the spacing between various pixels.

6. The system set forth in claim 1 wherein the images comprise still photographs.

7. The system set forth in claim 1 wherein the images comprise video images.

8. The system set forth in claim 1 wherein the camera is positioned above the holding tank and is focused on the wastewater in the holding tank therebelow.

9. The system set forth in claim 1 wherein the camera is contained within a waterproof housing and is submerged in the wastewater in the holding tank.

10. The system set forth in claim 1 wherein the means for injecting wastewater treatment chemicals into the wastewater stream injects the chemicals upstream and prior to flow into the holding tank.

11. The system set forth in claim 1 wherein the means for injecting wastewater treatment chemicals into the wastewater stream injects the chemicals downstream and after flow from the holding tank.

12. The system set forth in claim 1 wherein the means for injecting wastewater treatment chemicals into the wastewater stream injects the chemicals into the holding tank.

13. The system set forth in claim 1 for use in batch treatment processes.

14. The system set forth in claim 1 for use in flow-through treatment processes.

15. The system set forth in claim 1 wherein the wastewater treatment chemicals are selected from the group consisting of precipitants, coagulants, flocculants, anti-foam or wetting agents, and weighting agents.

* * * * *